United States Patent
Numrich et al.

(10) Patent No.: US 12,060,278 B2
(45) Date of Patent: Aug. 13, 2024

(54) METHOD FOR PRODUCING AN AEROGEL MATERIAL

(71) Applicant: EVONIK OPERATIONS GMBH, Essen (DE)

(72) Inventors: Uwe Numrich, Gross-Zimmern (DE); Björn Lazar, Hasselroth (DE); Karl Ost, Rodenbach (DE); Matthias Koebel, Brüttisellen (CH); Ana Stojanovic, Zürich (CH); Lukas Huber, Dübendorf (CH)

(73) Assignee: Evonik Operations GmbH, Essen (DE)

( * ) Notice: Subject to any disclaimer, the term of this patent is extended or adjusted under 35 U.S.C. 154(b) by 874 days.

(21) Appl. No.: 16/978,164

(22) PCT Filed: Sep. 20, 2018

(86) PCT No.: PCT/EP2018/075446
§ 371 (c)(1),
(2) Date: Sep. 3, 2020

(87) PCT Pub. No.: WO2019/170264
PCT Pub. Date: Sep. 12, 2019

(65) Prior Publication Data
US 2021/0039954 A1    Feb. 11, 2021

(30) Foreign Application Priority Data
Mar. 5, 2018 (EP) .................................. 18159929

(51) Int. Cl.
| *C01B 33/158* | (2006.01) |
| *C01B 33/16* | (2006.01) |
| *E04B 1/74* | (2006.01) |
| *E04B 1/78* | (2006.01) |

(52) U.S. Cl.
CPC ........ *C01B 33/1585* (2013.01); *C01B 33/166* (2013.01); *E04B 1/78* (2013.01); *C01P 2006/10* (2013.01); *C01P 2006/32* (2013.01); *E04B 2001/742* (2013.01)

(58) Field of Classification Search
CPC ... C01B 33/1585; C01B 33/166; C01B 33/16; E04B 1/78; E04B 2001/742; C01P 2006/10; C01P 2006/32; B01J 13/0091
See application file for complete search history.

(56) References Cited

U.S. PATENT DOCUMENTS

| 2,595,262 | A | 5/1952 | Hood |
| 3,532,473 | A | 10/1970 | Biegler et al. |
| 3,562,177 | A | 2/1971 | Teicher et al. |
| 3,574,027 | A | 4/1971 | Bonnet |
| 4,048,290 | A | 9/1977 | Lee |
| 4,175,159 | A | 11/1979 | Raleigh |
| 4,212,925 | A | 7/1980 | Kratel et al. |
| 4,247,708 | A | 1/1981 | Tsutsumi et al. |
| 4,276,274 | A | 6/1981 | Heckel |
| 4,286,990 | A | 9/1981 | Kleinschmidt et al. |
| 4,297,143 | A | 10/1981 | Kleinschmidt et al. |
| 5,086,031 | A | 2/1992 | Deller et al. |
| 5,183,710 | A | 2/1993 | Gerbino |
| 5,458,916 | A | 10/1995 | Kratel et al. |
| 5,556,689 | A | 9/1996 | Kratel et al. |
| 5,565,142 | A | 10/1996 | Deshpande et al. |
| 5,685,932 | A | 11/1997 | Stohr et al. |
| 5,776,240 | A | 7/1998 | Deller et al. |
| 5,851,715 | A | 12/1998 | Barthel et al. |
| 6,099,749 | A | 8/2000 | Boes et al. |
| 6,268,423 | B1 | 7/2001 | Mayer et al. |
| 6,303,256 | B1 | 10/2001 | Kerner et al. |
| 6,472,067 | B1 | 10/2002 | Hsu et al. |
| 6,479,156 | B1 | 11/2002 | Schmidt et al. |

(Continued)

FOREIGN PATENT DOCUMENTS

| CA | 2 201 186 | 9/1997 |
| CN | 106316439 | 1/2017 |

(Continued)

OTHER PUBLICATIONS

Machine Translation of WO2015014813A1 (Year: 2015).*
U.S. Appl. No. 17/927,040, filed Nov. 22, 2022, Giesseler.
English language translation of the International Search Report for corresponding PCT/EP2018/075446 filed Sep. 20, 2018.
English language translation of the Written Opinion of the International Searching Authority for corresponding PCT/EP2018/075446 filed Sep. 20, 2018.
English language translation of the International Preliminary Report on Patentability for corresponding PCT/EP2018/075446 filed Sep. 20, 2018.
Pajonk, et al., "Physical properties of silica gels and aerogels prepared with new polymeric precursors," *J. Non-Cryst. Solids* 186(2):1-8 (Jun. 1995).

(Continued)

*Primary Examiner* — Colin W. Slifka
*Assistant Examiner* — Logan Edward Laclair
(74) *Attorney, Agent, or Firm* — Law Office of Michael A. Sanzo, LLC

(57) ABSTRACT

The present invention relates to a process for producing an aerogel material based on amorphous silica, comprising the following steps:
a) preparing a mixture comprising silica sol, alcohol, and a hydrophobizing agent activatable by acid catalysis;
b1) adding a base to the mixture formed in step a) and mixing the resulting mixture;
b2) gelation of the mixture comprising silica sol obtained in step b2), resulting in the formation of a silica gel, and optional aging of the gel;
c) adding a hydrophobization catalyst to the silica gel formed in step b2) and optionally aged, in-situ formation or controlled release of a hydrophobization catalyst, and initiation of the catalyzed hydrophobization of the silica;
d) removing the volatile constituents of the mixture formed in step c) by subcritical drying, resulting in the formation of the aerogel material, wherein at least steps b2) to d) are carried out in the same reactor.

13 Claims, No Drawings

(56) References Cited

U.S. PATENT DOCUMENTS

| | | | |
|---|---|---|---|
| 7,241,336 | B2 | 7/2007 | Scharfe et al. |
| 7,562,534 | B2 | 7/2009 | Jibb et al. |
| 7,674,476 | B1 | 3/2010 | Schwertfeger et al. |
| 7,855,248 | B2 | 12/2010 | Stenzel et al. |
| 8,333,946 | B2 | 12/2012 | Gottschalk et al. |
| 8,389,617 | B2 | 3/2013 | Meyer et al. |
| 8,603,353 | B2 | 12/2013 | Menzel et al. |
| 8,962,519 | B2 | 2/2015 | Heindl et al. |
| 9,233,986 | B2 | 1/2016 | Kratel et al. |
| 9,540,247 | B2 | 1/2017 | Stenzel et al. |
| 9,593,797 | B2 | 3/2017 | Kulprathipanja et al. |
| 9,784,402 | B2 | 10/2017 | Menzel |
| 9,878,911 | B2 | 1/2018 | Maisels et al. |
| 10,005,942 | B2 | 6/2018 | Kim et al. |
| 10,125,234 | B2 | 11/2018 | Hoffman et al. |
| 10,179,751 | B2 | 1/2019 | Geisler et al. |
| 10,618,815 | B2 | 4/2020 | Hindelang et al. |
| 10,618,849 | B2 | 4/2020 | Albinus et al. |
| 10,843,965 | B2 | 11/2020 | Jantke et al. |
| 11,046,850 | B2 | 6/2021 | Bender et al. |
| 2003/0095905 | A1 | 5/2003 | Scharfe et al. |
| 2006/0027227 | A1 | 2/2006 | Everett et al. |
| 2007/0220904 | A1 | 9/2007 | Jibb et al. |
| 2009/0311159 | A1 | 12/2009 | Gray |
| 2010/0146992 | A1 | 6/2010 | Miller |
| 2010/0300132 | A1 | 12/2010 | Schultz |
| 2012/0064345 | A1 | 3/2012 | Gini |
| 2012/0286189 | A1 | 11/2012 | Barthel et al. |
| 2013/0071640 | A1 | 3/2013 | Szillat |
| 2014/0150242 | A1 | 6/2014 | Kratel et al. |
| 2014/0323589 | A1 | 10/2014 | Lázár et al. |
| 2015/0000259 | A1 | 1/2015 | Dietz |
| 2016/0082415 | A1 | 3/2016 | Drexel et al. |
| 2016/0084140 | A1 | 3/2016 | Dietz |
| 2016/0223124 | A1 | 8/2016 | Kulprathipanja et al. |
| 2016/0258153 | A1 | 9/2016 | Koebel et al. |
| 2017/0014792 | A1 | 1/2017 | Bonnardel et al. |
| 2017/0029681 | A1 | 2/2017 | Kim et al. |
| 2017/0233297 | A1 | 8/2017 | Albinus et al. |
| 2017/0268221 | A1 | 9/2017 | Geisler et al. |
| 2018/0001576 | A1 | 1/2018 | Koebel et al. |
| 2018/0065892 | A1 | 3/2018 | Geisler et al. |
| 2019/0276358 | A1 | 9/2019 | Schultz et al. |
| 2019/0382952 | A1 | 12/2019 | Geisler et al. |
| 2020/0031720 | A1 | 1/2020 | Geisler et al. |
| 2020/0062661 | A1 | 2/2020 | Geisler et al. |
| 2020/0124231 | A1 | 4/2020 | Geisler et al. |
| 2021/0269359 | A1 | 9/2021 | Geisler et al. |
| 2021/0292233 | A1 | 9/2021 | Numrich et al. |
| 2021/0292238 | A1 | 9/2021 | Albinus et al. |
| 2023/0002627 | A1 | 1/2023 | Lazar et al. |
| 2023/0062574 | A1 | 3/2023 | Menzel et al. |
| 2023/0110025 | A1 | 4/2023 | Gärtner et al. |
| 2023/0286814 | A1 | 9/2023 | Giesseler et al. |
| 2023/0348285 | A1 | 11/2023 | Numrich et al. |

FOREIGN PATENT DOCUMENTS

| | | | |
|---|---|---|---|
| CN | 106830878 | | 6/2017 |
| DE | 952891 | | 11/1956 |
| DE | 2533925 | | 2/1977 |
| DE | 30 37 409 | | 5/1982 |
| DE | 199 48 394 | | 2/2001 |
| DE | 20 2007 013 074 | | 3/2008 |
| DE | 10 2007 020 716 | | 11/2008 |
| DE | 10 2007 031 635 | | 1/2009 |
| DE | 10 2007 042 000 | | 3/2009 |
| DE | 10 2007 051 830 | | 5/2009 |
| DE | 10 2008 005 548 | | 7/2009 |
| DE | 10 2008 036 430 | | 2/2010 |
| DE | 10 2010 040 346 | | 3/2012 |
| DE | 10 2013 016 705 | | 4/2015 |
| DE | 10 2014 203 091 | | 8/2015 |
| EP | 0 032 176 | | 7/1981 |
| EP | 0 340 707 | | 11/1989 |
| EP | 0 645 576 | | 3/1995 |
| EP | 0 647 591 | | 4/1995 |
| EP | 0 937 755 | | 8/1999 |
| EP | 2 028 329 | | 2/2009 |
| EP | 2 204 513 | | 7/2010 |
| EP | 2 910 724 | | 8/2015 |
| EP | 3 447 038 | | 8/2017 |
| EP | 3 403 818 | | 11/2018 |
| EP | 3 498 672 | | 6/2019 |
| FR | 2873677 | | 2/2006 |
| JP | H 10-152360 | | 6/1998 |
| KR | 10-2012-0070948 | | 7/2021 |
| NO | 621873 | | 4/2018 |
| WO | WO 99/05447 | | 2/1999 |
| WO | WO 03/064025 | | 8/2003 |
| WO | WO 2005/028195 | | 3/2005 |
| WO | WO 2006/097668 | | 9/2006 |
| WO | WO 2010/126792 | | 11/2010 |
| WO | WO 2011/020671 | | 2/2011 |
| WO | WO 2011/066209 | | 6/2011 |
| WO | WO 2011/076518 | | 6/2011 |
| WO | WO 2011/083174 | | 7/2011 |
| WO | WO 2012/041823 | | 4/2012 |
| WO | WO 2012/044052 | | 4/2012 |
| WO | WO 2013/053951 | | 4/2013 |
| WO | WO 2014/090790 | | 6/2014 |
| WO | WO 2014/095277 | | 6/2014 |
| WO | WO 2015/007450 | | 1/2015 |
| WO | WO-2015014813 A1 * | 2/2015 | ........... C01B 33/145 |
| WO | WO 2016/045777 | | 3/2016 |
| WO | WO 2016/171558 | | 10/2016 |
| WO | WO 2017/097768 | | 6/2017 |
| WO | WO 2017/102819 | | 6/2017 |
| WO | WO 2021/069351 | | 4/2021 |

OTHER PUBLICATIONS

Somana, Chotangada Gautham, "Evaluation of Aerogel Composite Insulations by Characterization and Experimental Methods," Thesis; B.Eng., R. V. College of Engineering, Banglore, India, (2012).

U.S. Appl. No. 17/792,400, filed Jul. 31, 2022, Lazar.

U.S. Appl. No. 17/792,471, filed Jul. 13, 2022, Menzel.

International Search Report for PCT/EP2019/068361 filed Jul. 9, 2019; corresponding to copending U.S. Appl. No. 17/260,345.

Written Opinion of the International Searching Authority for PCT/EP2019/068361 filed Jul. 9, 2019; corresponding to copending U.S. Appl. No. 17/260,345.

International Preliminary Report on Patentability for PCT/EP2019/068361 filed Jul. 9, 2019; corresponding to copending U.S. Appl. No. 17/260,345.

Mathias, et al., "Basic characteristics and applications of aerosil: 30. The chemistry and physics of the aerosil surface," *Journal of Colloid and Interface Science* 125:61-68 (1988).

U.S. Appl. No. 17/260,345, filed Jan. 14, 2021, Numrich.

International Search Report for PCT/EP2021/050105 filed Jan. 6, 2021; corresponding to copending application U.S. Appl. No. 17/792,400.

Written Opinion of the International Searching Authority for PCT/EP2021/050105 filed Jan. 6, 2021; corresponding to copending application U.S. Appl. No. 17/792,400.

International Preliminary Report on Patentability for PCT/EP2021/050105 filed Jan. 6, 2021; corresponding to copending application U.S. Appl. No. 17/792,400.

Partial European Search Report and Search Opinion for U.S. Appl. No. 17/792,400; corresponding to copending application U.S. Appl. No. 17/792,400.

International Search Report for PCT/EP2021/060255 filed Apr. 20, 2020; corresponding to copending application U.S. Appl. No. 17/922,203.

Written Opinion of the International Searching Authority for PCT/EP2021/060255 filed Apr. 20, 2020; corresponding to copending application U.S. Appl. No. 17/922,203.

International Preliminary Report on Patentability for PCT/EP2021/060255 filed Apr. 20, 2020; corresponding to copending application U.S. Appl. No. 17/922,203.

(56) References Cited

OTHER PUBLICATIONS

European Search Report and Search Opinion for U.S. Appl. No. 17/922,203; corresponding to copending application U.S. Appl. No. 17/922,203.

Malfait, Wim J., et al., Surface Chemistry of Hydrophobic Silica Aerogels, » *Chemistry of Materials* 27(19):6737-6745 (Oct. 2015).

U.S. Appl. No. 17/802,656, filed Aug. 26, 2022, Gärtner.

U.S. Appl. No. 17/922,203, filed Oct. 28, 2022, Numrich.

Schreiner, et al., "Intercomparison of thermal conductivity measurements on an expanded glass granulate in a wide temperature range," *International Journal of thermal Sciences* 95:99-105 (2015).

Ulmann's Encyclopedia of Industrial Chemistry, "Silica" chapter, published online on Apr. 15, 2008, DOI: 10.1002/14356007.a23_583.pub3.

U.S. Appl. No. 16/339,081, filed Apr. 3, 2019, US-2019/0276358 A1, Sep. 12, 2019, Schultz.

U.S. Appl. No. 16/478,169, filed Jul. 16, 2019, US-2020/0031720 A1, Jan. 30, 2020, Geisler.

U.S. Appl. No. 16/484,368, filed Aug. 7, 2019, US-2019/0382952 A1, Dec. 9, 2019, Geisler.

U.S. Appl. No. 16/605,342, filed Oct. 15, 2019, US-2020/0062661 A1, Feb. 27, 2020, Geisler.

U.S. Appl. No. 16/620,481, filed Dec. 6, 2019, US-2020/0124231 A1, Apr. 23, 2020, Geisler.

U.S. Appl. No. 17/260,227, filed Jan. 14, 2021, Geisler.

U.S. Appl. No. 17/260,371, filed Jan. 14, 2021, Albinus.

Non Final Office Action mailed Sep. 1, 2023 for copending U.S. Appl. No. 17/260,345, filed Jan. 14, 2021.

Response to Non Final Office Action filed Nov. 25, 2023 for copending U.S. Appl. No. 17/260,345, filed Jan. 14, 2021.

Notice of Allowance mailed Dec. 20, 2023 for for copending U.S. Appl. No. 17/260,345, filed Jan. 14, 2021.

* cited by examiner

METHOD FOR PRODUCING AN AEROGEL MATERIAL

CROSS REFERENCE TO RELATED APPLICATIONS

The present application is US national stage of international application PCT/EP2018/075446, which had an international filing date of Sep. 20, 2018, and which was published on Sep. 12, 2019. The application claims priority to European application EP 18159929.1, filed on Mar. 5, 2018.

The present invention relates to a special process for producing aerogels, to the aerogel producible thereby, and to the use of such an aerogel for thermal insulation.

By virtue of their very low thermal conductivity and material density, silica-based aerogels and xerogels are finding increasing use as highly efficient insulation materials, for example in building insulation. Cost-effective production of aerogels and xerogels is becoming increasingly important. Numerous methods for their production are known. Typically, the starting point is waterglass (sodium silicate) or silicon alkoxylates (organosilicates) such as tetraethyl orthosilicate (TEOS) and tetramethyl orthosilicate (TMOS) as silicon raw material, which form initially a silica sol and then a silica gel. The key step in the production of aerogel materials is generally the drying of a wet gel. Aerogels have in the past traditionally been produced exclusively through supercritical drying, i.e. drying from a supercritical fluid typically lower alcohols (high-temperature supercritical drying or HTSCD) and nowadays preferably $CO_2$ (low-temperature supercritical drying or LTSCD). In the drying process, it was necessary that the critical parameters specific to the solvent used, such as temperature and pressure, were not exceeded. The critical temperature and critical pressure for $CO_2$ are around 31° C. and around 74 bar. Carrying out the reaction at such high process pressure necessitates relatively cost-intensive process control and investment on equipment for the production of aerogels.

An important breakthrough in the production of aerogels or xerogels of similar structure was achieved by subcritical drying at standard pressure from solvent-containing, hydrophobized gels. This method is described for example in U.S. Pat. No. 5,565,142 A1. Such drying under subcritical conditions makes it possible to produce materials with almost identical properties to the supercritically dried aerogels. In the early years these had been named xerogels according to the classical definition, a term that is still used today for aerogels subcritically dried from solvents. Rather than the classical definition of aerogels used based on the nature of their production, the definition based on typical material properties (density<0.30 g/cm³, porosity>85%, pore size 20 to 80 nm) is instead used hereinafter. Subcritically dried materials are thus referred to still as aerogels and not as xerogels.

WO 2012/044052 A2 relates to the preparation of optically transparent and non-transparent $SiO_2$ aerogel in granular form. This is done by injecting a waterglass sol into an alcohol phase, which results in the formation of a gel. The gel is additionally exchanged with alcohol and hydrophobized using a silylation reagent. The gel is then dried at standard pressure or under reduced pressure. The process allows aerogel granules to be produced in appreciably less time, but a significant disadvantage is the washing with ethanol, which is necessary in order to remove the water from the hydrogel phase. The processing of the water-alcohol mixture requires large amounts of energy, which, for large-scale industrial production, is a considerable disadvantage of this process. The hydrophobization of alcogels in a mixture of hydrophobizing agent and hydrophobizing catalyst (HCl) should be mentioned as particularly important for this invention.

WO2013/053951 A1 discloses a process for producing a xerogel that comprises the following sequence of process steps: (a) producing an alcohol-containing sol; (b)-(c) gelation and aging of the sol; (d) hydrophobizing the sol produced and aged in steps (b) and (c); (e) optional predrying of the hydrophobized sol at a temperature below 80° C., and (f) complete drying at a temperature above 100° C. The final step (d) of the process is carried out in a separate oven. According to WO2013/053951 A1, such stepwise drying of the aerogel, in contrast to drying in a single step as described for example in FR 2873677 A1, allows a homogeneous aerogel to be obtained. The working examples additionally show that the omission of the predrying step results in higher thermal conductivity in the material obtained. Because the hydrophobizing agent is not added until step (d), to a finished and aged gel, inhibited diffusion can result not only in inhomogeneous hydrophobization of the gel body, but also in very long hydrophobization times.

WO2015/014813 A1 discloses a process in which a) a silica sol comprising a hydrophobizing agent activatable by acid catalysis is produced in an alcoholic solvent mixture; b) base is added to initiate gelation of the sol, which is optionally also aged; c) the gel is hydrophobized through the addition of acid and d) the solvent mixture is removed by subcritical drying, resulting in the formation of the aerogel material. Since the hydrophobizing agent is already added before gel formation, this results in homogeneous and rapid hydrophobization of the gel and in appreciably lower use of hydrophobizing agent. The working examples for this patent application show different variants of such multistep production of aerogel-based materials such as granules, plates or composites. In the production of aerogel granules for example, the gel formed in a stirred-tank reactor is mechanically comminuted, hydrophobized in another pressure reactor, and then dried on a conveyor belt at 150° C. Such a multistep process design involving multiple transfers of intermediate products from one reactor to another is very laborious and adds to the production costs of finished aerogels.

WO 2016/124680 A1 describes a process for producing an aerogel material, similar to the process in WO2015/014813 A1, which comprises the production of a sol, conversion of the sol into a gel, and the subsequent hydrophobization thereof, the main focus here being the structuring of gel bodies and resulting options for streamlining plant engineering and process control. The hydrophobized gel rods are taken out of the first reactor and dried in an oven at 150° C., with the gel rods breaking up into smaller fragments during drying, leaving behind aerogel granules. As also described in WO2015/014813 A1, the drying step of this process takes place in a separate reactor, which in turn necessitates a transfer of the intermediate product and the construction of a separate drying unit.

The processes for producing aerogel materials known from the prior art are technically demanding and economically costly, inter alia because different steps of such multistep processes are very time-consuming and take place in more than one reactor.

The object of the present invention is to provide an improved process for producing silica-based aerogel materials that ensures good product quality allied with a shorter process time and less process complexity. In particular, the object of the present invention is to provide a process that involves minimal handling of intermediate products during production of the aerogel material and, if possible, allows transfer from one reactor to another to be dispensed with.

These objects were achieved by a process for producing an aerogel material based on amorphous silica that comprises the following steps:
a) preparing a mixture comprising silica sol, alcohol, and a hydrophobizing agent activatable by acid catalysis;
b1) adding a base to the mixture formed in step a) and mixing the resulting mixture;
b2) gelation of the mixture comprising silica sol obtained in step b2), resulting in the formation of a silica gel, and optional aging of the gel;
c) adding a hydrophobization catalyst to the silica gel formed in step b2) and optionally aged, in-situ formation or controlled release of a hydrophobization catalyst, and initiation of the catalyzed hydrophobization of the silica gel;
d) removing the volatile constituents of the mixture formed in step c) by subcritical drying, resulting in the formation of the aerogel material, wherein at least steps b2) to d) are carried out in the same reactor.

The process according to the invention allows aerogel materials in particular to be produced in particulate form, for example as powders or granules. In the case of powders, this is understood as meaning particles having an average numerical particle size of up to 50 μm, whereas granules usually consist of particles having an average numerical particle size of 50 μm to 10 mm. The process according to the invention is particularly suitable for producing aerogel granules having an average numerical particle size of 50 μm to 10 mm. The numerical average particle size of the powder or granulate can be determined according to ISO13320:2009 by laser diffraction particle size analysis. The resulting measured particle size distribution is used to define the average $d_{50}$, which represents, as the numerical average particle size, the particle size not exceeded by 50% of all particles.

The mixture produced in step a) of the process according to the invention essentially consists of a silica sol, one or more lower alcohols, and a hydrophobizing agent activatable by acid catalysis. The alcohol is preferably selected from the group consisting of methanol, ethanol, n-propanol, isopropanol, butanol, and mixtures thereof.

The silica sol may be produced in step a) by hydrolysis of an organosilicate $Si(OR)_4$, in neat form or as a solution in an alcohol. The organosilicate may be selected from a group consisting of tetraethyl orthosilicate (TEOS, $R=C_2H_5$), tetramethyl orthosilicate (TMOS, $R=CH_3$), tetraisopropyl orthosilicate (TPOS, R=i-Pr), and mixtures thereof. The silica sol may subsequently be diluted using an organic solvent mixture consisting of an alcohol from the group described above, a hydrophobizing agent activatable by acid catalysis, and water.

It goes without saying that, in addition to alcohol, silica sol, and hydrophobizing agent activatable by acid catalysis, the mixture produced in step a) may contain a small proportion of water, unavoidable impurities, and certain additives customary in the production of silica sols. This mixture may additionally comprise at least one polymerizable functional silane and optionally also one or more monomers capable of forming a polymer structure within the aerogel material to be produced. The polymerizable functional silane advantageously contains groups polymerizable by free radicals, as in the case of the conventional vinyltrialkoxysilanes such as vinyltriethoxysilane and vinyltrimethoxysilane or 3-trialkoxysilylpropyl methacrylates such as trimethoxysilylpropyl methacrylate or triethoxysilylpropyl methacrylate. Preferred monomers are likewise selected from the group of substances polymerizable by free radicals, such as acrylates, vinyl chloride, styrene or divinylbenzene. Additionally or alternatively, additives providing mechanical reinforcement, such as short fibers, for example glass fibers or mineral fibers, may be added to the mixture containing silica sol.

Reaction of organosilicates with water results in their hydrolysis, with the alkoxy groups (OR) bonded to silicon being partially or completely replaced by silanol groups Si—OH, which may in turn react with one another and form siloxane linkages (Si—O—Si) through so-called polycondensation reactions. Hydrolysis and condensation are dynamic reactions involving many interconnected chemical equilibria that are strongly influenced by catalysts such as acids and bases. Such a hydrolyzate of an organosilicate, consisting of nanoscale colloid particles composed of amorphous $SiO_2$ having a significant residual proportion of unhydrolyzed alkoxy groups Si—OR, usually have low viscosity and are referred to as a silicon dioxide sol or silica sol.

In the production of silica sols in step a) of the process according to the invention, catalytic amounts of an acid and substoichiometric amounts of water are preferably added to an alcoholic solution of the organosilicate, wherein the organosilicate/water/acid molar ratio of 1:1-3.5:0.0001-0.01, more preferably of 1:1-2.5:0.0005-0.005, is adhered to. Examples of acids that may be used are sulfuric acid, hydrogen chloride or nitric acid.

A hydrophobizing agent is understood as meaning a component that imparts hydrophobic, water-repellent properties to an oxide surface. This is achieved through the reaction of a hydrophobizing agent, wherein alkylalkoxysilanes become covalently bound to the oxide surface. Examples of typical hydrophobizing agents for silica are organosilanes, organosiloxanes, and organosilazanes. It is known from WO2015/014813 A1 that some of these hydrophobizing agents are capable of being activated by acid catalysis, which means that, in the presence of catalytic amounts of certain acids, they are able to react with a silica surface at lower temperature and/or more rapidly than in the absence of catalyst. Examples of such hydrophobizing agents activatable by acid catalysis include organosiloxanes and other alkylalkoxysilanes. Particularly suitable as hydrophobizing agents activatable by acid catalysis are hexamethyldisiloxane and trialkylalkoxysilanes, especially trimethylalkoxysilanes such as trimethylethoxysilane and trimethylmethoxysilane. The hydrophobizing agents activatable by acid catalysis of the present invention are very particularly preferably selected from the group consisting of hexamethyldisiloxane, trimethylethoxysilane, trimethylmethoxysilane, and mixtures thereof.

By adding a base to the mixture containing silica sol formed in step a) and subsequent mixing, a gelation process is initiated in step b1) of the process according to the invention shortly before the actual gelation and optional aging of the gel formed in step b2) can take place. The previously described Si—OH silanol groups formed through hydrolysis of the organosilicate groups on the surface of the already-formed colloid particles undergo condensation in step b2), now catalyzed by addition of base, optionally by additional heating, resulting in the formation of a three-dimensional particle network termed the silicon dioxide gel or silica gel. The gel thus formed in an alcohol/hydrophobizing agent medium, which can also be referred to as an "organogel", is typically subjected to a further aging step, wherein the particle network structure is mechanically reinforced with the formation of new chemical bonds. In practice, the sol system and the amount of base added are usually chosen such that the gelation time is between 5 and 15 minutes. If the addition of base and mixing take place outside the reactor in which the remaining process steps b2)-d) are being carried out, a transfer to this reactor must take place before gelation commences. The actual gelation and optional aging of the gel formed in step b2) anyhow takes place in the reactor mentioned, which is where all process steps b2)-d) take place.

In step b1) of the process according to the invention it is possible for a slight increase in the viscosity of the mixture to take place, such that the ratio of dynamic viscosity of the mixture obtained in step b1) to the dynamic viscosity of the mixture formed in step a) is not more than 10, preferably not more than 5, more preferably not more than 2.

The gelation taking place in step b2) results in a substantial increase in the viscosity of the mixture, such that the ratio of dynamic viscosity of the gel formed in step b2) to the dynamic viscosity of the mixture formed in step a) is greater than 10, preferably greater than 50, more preferably greater than 100.

In step b1) of the process according to the invention, preference is given to using a base selected from the group consisting of ammonia, lower aliphatic alkylamines, aminosilanes, ammonium fluoride, alkali metal hydroxide (in particular sodium hydroxide or potassium hydroxide) or alkaline earth metal hydroxides. Lower aliphatic amines are understood as meaning primary, secondary or tertiary alkylamines having a molar mass of less than 500 g/mol. Examples of particularly suitable aminosilanes are aminopropyltrimethoxysilane or aminopropyltriethoxysilane. The base used in step b1) of the process according to the invention is particularly preferably selected from the group consisting of ammonia, ammonium fluoride or aminosilanes. In step b1) preference is given to adding a dilute solution of the base in a solvent, for example a dilute alcoholic ammonia solution.

Step b1) is preferably carried out within not more than 1 hour, preferably within 30 minutes, more preferably within 10 minutes, before step b2).

In a particular embodiment of the invention, steps b1) and b2) are carried out in one step, which means that the addition of the base and subsequent mixing are carried out in the reactor in which all the remaining process steps b2) to d) take place.

Step b2) may preferably be carried out at a temperature of 60° C. to 130° C., more preferably of 80° C. to 120° C. The usual duration of this step is 5 to 240 minutes, preferably 10 to 180 minutes. More preferably, step b2) of the process according to the invention is carried out at a temperature of 90 to 115° C. within 20 to 75 minutes. Because operations are carried out above the boiling point of the mixture (approx. 80° C. if ethanol is used as solvent), the use of pressure reactors is essential for carrying out steps b2) and c).

In step c) of the process according to the invention, the hydrophobization of the silica sol produced in step b2) is initiated by means of a hydrophobization catalyst. The hydrophobization catalyst may be added to the sol or else released directly in the silica sol.

Hydrophobizing agents activatable by acid catalysis are used in the process according to the invention. Such hydrophobizing agents are traditionally activated in the presence of Brønsted acids that generate $H^+$ or $H_3O^+$ ions. The gelation process, which proceeds under slightly basic conditions, and the hydrophobizing process, which proceeds under acidic conditions, may thus be carried out in the same organogel as discrete operations with a clear time separation.

In a particularly preferred embodiment of the invention, a hydrophobization catalyst is selected from the group consisting of hydrogen chloride (gaseous or as a solution), nitric acid, sulfuric acid, trimethylchlorosilane, and mixtures thereof. Particular preference is given to using, as hydrophobization catalysts, alcoholic solutions of hydrogen chloride, nitric acid, sulfuric acid or trimethylchlorosilane.

In a further embodiment of the invention, the hydrophobization catalyst is formed in situ in the gel by a free-radical degradation process. The hydrophobization catalyst is advantageously formed by free-radical degradation of previously added organochlorine compounds such as weakly stabilized or unstabilized PVC, trichloromethane, chloroacetone or tetrachlorethylene. The hydrophobization catalyst, which is advantageously HCl, may thus be released at a desired point in time, with release brought about either by electromagnetic radiation (UV, X-rays) or by conventional radical initiators. For gels with high optical transparency and low thickness, photochemical free-radical degradation processes are preferred.

In a further embodiment of the invention, the hydrophobization catalyst is released in the gel by slow-release agents, with release being optionally initiated or accelerated by thermal activation. In this case, preference is given to using as the hydrophobization catalyst hydrogen chloride, nitric acid or sulfuric acid, or precursors thereof, which are released from "slow-release" or "controlled-release" additives present in the sol, such as microcapsules, nanocapsules or particles. These agents are ideally activated via externally controllable process parameters such as pressure, temperature or electromagnetic radiation (light, radio waves, microwaves).

Step b2) and/or step c) of the process according to the invention is preferably carried out in a pressure vessel at a pressure of 1 to 20 bar, more preferably at a pressure of 1.1 to 10 bar (absolute), most preferably at a pressure of 1.2 to 5 bar (absolute). At standard pressure, the boiling point of the solvent mixture used is usually between 80 and 100° C. By analogy with the example of a pressure cooker, working in the pressure vessel allows step b2) according to the invention to be carried out at appreciably higher temperatures in the range 80-130° C., which increases the rate of reaction. This allows the hydrophobization time to be drastically reduced (for example from 24 hours at 65° C. to just 3 hours at 90° C.), which results in a considerable increase in process efficiency.

In a particularly preferred embodiment of the invention, the hydrophobization of the silica according to step c) is carried out at a temperature of 80 to 130° C., at a pressure of 1.2 to 4 bar, within 20 to 180 minutes.

In step d) of the process according to the invention, the volatile constituents present in the hydrophobized silica gel, such as alcohols and residual hydrophobizing agent for example, are removed by subcritical drying, leaving behind the ultimate aerogel structure. In this step, preferably over 95%, more preferably over 98%, of all volatile constituents are removed.

Volatile constituents of the mixture are understood as meaning all components that have a boiling point of less than 300° C. at standard pressure. Subcritical drying means that the set temperature and/or pressure during drying are lower than the critical parameters of the solvent mixture (pore liquid) used and that this pore liquid is accordingly not present as a supercritical fluid during drying.

In a preferred embodiment of the invention, step d) is carried out at least partially under reduced pressure, more preferably at an absolute pressure of 0.1 to 1 bar. Drying under reduced pressure has the advantage that it may be carried out at low temperature, i.e. with reduced thermal energy requirements. Working under reduced pressure thus achieves a lower content of residual solvents (residual moisture) in the aerogel material at the same temperature, particularly at the end of drying, From a process technology viewpoint, on the other hand, the transfer of heat through convective gas exchange with the material being dried increases with increasing pressure, which in turn reduces the drying time and boosts process efficiency. Step d) of the process according to the invention is particularly preferably carried out at a temperature of 100 to 200° C. and at a pressure of 0.1 to 4 bar.

In a further preferred embodiment of the invention, during the performance of step d) a carrier gas is passed into the reactor continuously and, after mixing with the gaseous constituents of the reactor, in turn exits the reactor. This allows the drying step to be shortened considerably and/or enables the production of aerogel materials having low residual moisture. The carrier gas used may be nitrogen, for example. The carrier gas used is particularly preferably preheated to a temperature of 50 to 200° C. The preheated carrier gas may advantageously be introduced into the reactor through a pressure adjustment from 1 to 4 bar. This promotes heat transfer between the gas introduced and the solid/liquid reaction mixture in the reactor. It has been found to be particularly advantageous when the gas input into the reactor per unit time and reactor volume corresponds to a gas hourly space velocity (GHSV) of 150 to 1500 $h^{-1}$, where:

GHVS $[h^{-1}]$=Gas input into the reactor in L per hour/reactor volume in L

Steps b2) to d) of the process according to the invention are carried out in a single reactor. This is preferably a closable pressure vessel designed for a process pressure of 0.05 to 20 bar. This reactor accordingly allows process steps to be carried out both at reduced pressure, for example of 0.05 to 1 bar, and at elevated pressure, for example of 1 to 20 bar.

The volatile constituents of the mixture obtained in the step that are removed in step d) of the process according to the invention are preferably recovered to an extent of at least 85%, more preferably at least 95%, and reused in step a). The recovery thereof may take place in a condenser connected downstream of the reactor, in which the gases exiting the reactor come into contact with a surface that is preferably cooled to a temperature of −50 to 50° C., wherein the components that are once again liquid under these conditions condense out and are separated off. Recovery and further use of the volatile constituents removed in step d), which mainly consist of the alcohol used, for example ethanol, and the hydrophobizing agent, make it possible to carry out the process cost-effectively. In a particularly preferred embodiment of the process according to the invention, >97% of the pore liquid present in the gel is recovered.

The reactor may be any shape known in process technology. Axially symmetric reactors have been found to be particularly preferable. Particular preference is given to using one or more tubes as reactors. In a particularly preferred embodiment of the invention, the reactor is designed as a bundle of tubes arranged parallel to one another. Various tube cross-sectional shapes may in principle be used. They are advantageously tubes having an inner profile that is circular or square, in particular square.

It is also advantageous for handling when a certain number of tubes is held together to form a tube bundle. In an advantageous embodiment, all tubes are identical in cross section, which is preferably round or hexagonal. This makes it possible to construct compact tube bundles in which there is little dead volume between the individual tubes. Particular preference is given to tubes having a maximum diameter from 5 to 50 mm, preferably from 10 to 35 mm, more preferably from 20 to 26 mm. In a particularly preferred embodiment of the invention, the reactor in which steps b2) to d) are carried out is a tube having a diameter of 5 to 50 mm or a bundle of a plurality of such tubes arranged parallel to one another.

The spatial orientation of the reactor used in steps b) to d) can sometimes play an important role in the optimization of operation using the process according to the invention.

It has been found that optimal results in drying step d) are achieved when the reactor tube is oriented horizontally or tilted slightly. The reactor orientation (tilt) may be changed between the performance of step b2) and d), for example from vertical to horizontal. However, it has been found to be particularly advantageous when the reactor used for carrying out steps b2) to d) of the process according to the invention is tilted at an angle during the performance of the process and is thus oriented neither horizontally nor vertically. A horizontal angle of 10 to 45 degrees has been found to be advantageous, with preference given to an angle of 15 to 30 degrees and particular preference to one of 17 to 25 degrees.

In a particularly preferred embodiment of the invention, the axis of symmetry in the longitudinal direction of the axially symmetric reactor used in steps b2) to c) forms a horizontal angle of 10 to 45 degrees, preferably 15 to 30 degrees, more preferably 17 to 25 degrees, during the performance of these steps.

The process described above permits the production of aerogel material having a density of less than 0.3 $g/cm^3$, preferably of less than 0.2 $g/cm^3$, more preferably of less than 0.15 $g/cm^3$, and a thermal conductivity of 12 to 30 mW/(mK) at standard pressure and 20° C. This may in particular be granules having an average numerical particle size of 50 µm to 10 mm.

The thermal conductivity of the aerogel bulk material in the form of powder or granules is measured according to EN 12667:2001 at an average measuring temperature of 20° C., a contact pressure of 250 Pa under an atmosphere of air, and at standard pressure.

The invention further provides a process in which a thermal and/or acoustic insulation panel is formed from the aerogel material produced by the process according to the invention. Such an insulation panel can reduce the transmission of heat and/or sound and thus has thermal and/or acoustic insulation properties.

The aerogel material produced by the process according to the invention or the insulation panel formed therefrom may be used for thermal insulation. In particular, the aerogel material produced according to the invention may be used in plaster, mortar and concrete formulations for thermal insulation. In addition, the aerogel material produced according to the invention may be used as bulk material for thermal insulation in bulk insulation uses, for example in thermal insulation containers. The aerogel material produced according to the invention may likewise be used in thermally and/or acoustically insulating coatings, for example as an energy-saving thermal insulation coating in industrial uses. In addition, the aerogel material produced according to the invention may be used to produce thermally insulating textile and film membranes for lightweight architectural construction uses.

EXAMPLES

Example 1

Preparation According to the Invention of an Aerogel in a Laboratory Reactor Block Provided with Appropriate Holes A tetraethyl orthosilicate-based (TEOS-based) sol concentrate having a degree of hydrolysis of 75% and an $SiO_2$ equivalent content of 20% by weight was prepared from TEOS according to J. Non-Cryst. Solids, 1995, 186, 1-8. The sol concentrate was diluted with ethanol and hexamethyldisiloxane (HMDSO) as hydrophobizing agent to about 6% by weight of $SiO_2$ equivalent content, the volume fraction of HMDSO in the sol being about 30% by volume. 1370 mL of this sol was preheated to 35° C. and activated by addition of 2 molar ethanolic ammonia solution and immediately used to fill the laboratory reactor block (diameter: 20 mm, length 250 mm) provided with appropriate holes. The reactor had been preheated beforehand to a plate temperature of 70° C. Gelation occurred after approx. 2-3 minutes, whereupon the reactor was closed pressure-tight and heated to a plate temperature of 110° C. This was accompanied by a rise of about 2.5-3 bar in the overpressure in the reactor. After aging for 2.5 hours, the heating was switched off and the reactor cooled for 45 minutes until the overpressure was <0.5 bar. The residual overpressure was carefully released and the reactor lid was removed. The bottom plate was loosened and approx. 250 mL of syneresis liquid (pore liquid) was drained off and recovered, which corresponded to shrinkage of the aged gel of approx. 18%. The bottom plate was then screwed back on tightly and 350 mL of dilute ethanolic $H_2SO_4$ solution (hydrophobization catalyst) was added, completely covering the gel rods in the reactor block with the hydrophobization catalyst liquid. The lid was then screwed back on medium-tight and the reactor heated to a nominal temperature of 110° C. by means of hotplates. The gel rods were then hydrophobized for 2.5 hours, with the measured overpressure being approx. 1.7 bar. The heating was then switched off again. After a cooling period of approx. 30 minutes, during which the residual overpressure fell below 0.5 bar, the reactor lid was carefully opened again and removed. The excess hydrophobization catalyst solution was drained off by loosening the bottom plate.

During the gelation, aging, and hydrophobization processes mentioned above, the reactor was positioned vertically (orientation of the holes/gel rods formed). For the drying process, the reactor lid was then screwed back on medium-tight and the reactor was laid on its side, resulting in a horizontal orientation of the gel rods. The locking screws for the bottom plate were loosened for the drying process so that there was a gap of approx. 1-2 mm between the reactor block and bottom plate through which the drying gases could escape.

Hot nitrogen (T=200° C.) was then introduced into the top part at a flow rate of 20 L/min and the reactor was heated to 180° C. (nominal hotplate temperature). Drying in the reactor was complete after approx. 1 hour, after which the nitrogen supply and reactor heating were switched off. The reactor was cooled for 45 minutes and approximately 1250 ml of a bluish-white, particulate, hydrophobic aerogel was obtained as bulk material. Analysis of the product revealed a bulk density of 0.11-0.13 $g/cm^3$ and a thermal conductivity of 17.8 mW/m K for the bulk material. The particle size distribution showed that over 90% of the particles had a particle size between 1.0 mm and 7.0 mm. Because the reactor design was not optimized for drying, slight differences in the quality of the material were detected at the top and bottom (approx. 10% difference in density). The total process time was 7.5 hours.

Comparative Example 1

Preparation of a Gel in a Plastic Tube-Bundle Reactor with Drying in a Drying Cabinet A silica sol concentrate in accordance with example 1 was diluted with ethanol and HMDSO to 5.7% by weight of $SiO_2$ equivalent content $SiO_2$. The proportion of HMDSO in the sol mixture was 33% by volume. 410 mL of this sol was mixed at room temperature with 10 mL of 2 M aqueous $NH_3$ solution and, after stirring briefly, transferred to a beaker that was filled completely with a bundle of cut-to-length plastic drinking straw tubes having an internal diameter of approx. 8 mm and made of polypropylene. The latter served as a mold for the (aero)gel rods being prepared.

The beaker was covered with a watch glass, sealed with Parafilm, and placed in a heating cabinet at 65° C. Gelation occurred after about 10-12 minutes—The gel rods were allowed to age at 65° C. for 14 hours. Approximately 80 mL of syneresis liquid was then decanted off and the drinking straws serving as molds were removed, leaving behind the vertical gel rods. A hydrophobization catalyst solution consisting of 250 mL of HMDSO, 10 mL of ethanol, and 7.5 mL of 37% by weight hydrochloric acid solution was then added, covering the gel rods generously (approx. 1.5 cm) with liquid. The beaker covered with a watch glass and sealed with Parafilm was incubated again in a heating cabinet at 65° C. for 24 hours for the purposes of the hydrophobization reaction. The excess hydrophobization catalyst solution was then decanted off, after which the gel rods were dried in a drying cabinet under a nitrogen atmosphere for 3 hours at 150° C.

The product was obtained in the form of relatively large rod fragments of hydrophobic aerogel having a length typically of between 4 mm and 15 mm and a diameter of approx. 6-6.5 mm. The bulk density of the material thus obtained was 0.113 $g/cm^3$. The thermal conductivity of the unchanged sample was 22-23 mW/m K. The relatively high value was due to the large fragments and the resulting proportion of large air holes. The total process time was 42 hours.

Compared to example 1, comparative example 1 has the disadvantage of needing an additional transfer of hydrophobized gel to the drying unit and associated additional investment costs in industrial equipment.

Example 2

Preparation According to the Invention of an Aerogel in a Single-Tube Reactor An electrically-heatable tube made of stainless steel 1.4571 (internal diameter 20 mm, length 150 mm) with flange and media-tight valves at the top and bottom was chosen as the test reactor. In addition, a reservoir vessel was flange-mounted at the top unit and one at the bottom unit. Pressure equalization could likewise be achieved via a gas-displacement line. The reactor was at an inclination of 22° to horizontal throughout the test.

First of all, a P750 sol concentrate having an $SiO_2$ equivalent content of 20.0% by weight was prepared from Dynasilan 40 (manufacturer: Evonik Ressource Efficiency GmbH) and diluted to 5.8% by weight with ethanol and HMDSO (30% by volume in the sol). A dilute ammonia solution was then added at room temperature with stirring, 470 ml of the activated sol mixture was transferred to the single-tube reactor preheated to 65° C., and the latter was closed pressure-tight. 15 minutes after filling the reactor, the nominal temperature was raised to 100° C., which was accompanied by a rise in overpressure to approx. 2.0 bar. After aging for 1 hour, the heating was switched off. 90 mL of syneresis liquid was then drained off into a reservoir vessel likewise connected to the gas-displacement line and removed from the system. The top reservoir was then filled with 200 ml of a dilute ethanolic nitric acid solution and this was added slowly via the top reservoir. The tube reactor was closed again pressure-tight and heated to a nominal temperature of 100° C. The gel rod in the tube was now hydrophobized for 90 minutes, with the overpressure being approx. 1.5 bar. With the heating switched on, the residual hydrophobization catalyst liquid was then removed in accordance with the procedure described above and the pressure in the reactor was slowly vented to the atmosphere. Hot nitrogen (T=200° C.) having a flow rate of 9 L/min set on the mass-flow controller was then introduced at the reactor base and the offgas was conducted away via the top part and a condenser. The single-tube reactor was then heated to 165° C. within 10 minutes. Drying in the reactor was complete after approx. 45 minutes. The yield was 500 ml of a particulate, hydrophobic aerogel bulk material, which corresponds to a yield of >95%. Analysis of the product revealed a bulk density of 0.124 g/cm$^3$ and a thermal conductivity of 17.6 mW/m K for the bulk material. The particle size distribution showed a symmetrical distribution with a diameter in the range between 0.3 mm and 5 mm. The total process time lasted 5 hours.

Example 3

Preparation According to the Invention of an Aerogel in a Single-Tube Reactor: Altering the Inclination of the Single-Tube Reactor During the Process A test analogous to example 2 was carried out using the same starting sol and identical process parameters. On filling the reactor, this was in the vertical position. At the end of aging and after draining the syneresis liquid, the hydrophobization catalyst solution was added at the top in the manner described in example 2 while still vertically oriented. The hydrophobization catalyst was recovered via the top part by tilting into the vertical position with the reactor open.

The reactor was rotated into the horizontal position to dry.

This example shows that all process steps (gelation, aging, hydrophobization, and drying) should preferably be carried out at a slight inclination to the horizontal.

Example 4

Preparation According to the Invention of an Aerogel in a Tube-Bundle Reactor

The pilot plant used consisted of a stirred-tank reactor for the preparation of the sol and a tube-bundle reactor with top and lid unit, and also appropriate auxiliary units (heating, heat exchanger, condenser) and tanks/reservoirs for the reagents used. The tube-bundle reactor consisted of a heat exchanger of parallel tubes, each with an internal diameter of 18 mm, and a jacket that can be flushed with heat-transfer fluid. The reactor was screwed firmly to the floor at a fixed angle to the horizontal of 19°.

First of all, 76 L of a sol according to example 2 was prepared by diluting the sol concentrate with ethanol and HMDSO in a stirred-tank reactor and preheated to 45° C.

Dilute ethanolic ammonia solution was then added and the sol thus activated was transferred to the tube-bundle reactor preheated to 60° C. via a transfer line with pressure equalization. In an alternative embodiment, a dilute ammonia solution and the sol mixture diluted with ethanol and HMDSO were fed into the reactor in the desired ratio by means of two separate pipelines and, during the filling process, mixed homogeneously in the reactor by means of a mixing device situated at the reactor inlet, such as a set of apertures or a static mixer. The top and bottom valves of the reactor were then closed, whereby the heat-exchanger tubes, together with the gel rods that were forming, formed a pressure-tight closed system.

The reactor temperature was then raised to 112° C. by heating the heat-exchanger fluid. This was accompanied by a rapid rise in pressure to a value of 2.5 bar. After aging for a period of 60 minutes, the bottom and top valves were carefully opened and the syneresis fluid was collected in the reservoir. 18.5 L of a dilute solution of nitric acid in ethanol was then preheated to 60° C. in the stirred-tank reactor and afterwards pumped into the reservoir just mentioned. The heating of the heat exchanger of the tube-bundle reactor was set to 95° C. The hydrophobization catalyst was then pumped into the tube-bundle reactor slowly, in portions, and the nominal temperature for the heating was raised to 112° C. After a hydrophobization time of 70 minutes, the excess hydrophobization catalyst liquid was removed from the system. The system consisting of reactor and peripheral circuit was vented slowly against a nitrogen atmosphere, with a nitrogen flow of 1.36 m$^3$/min set at the end of this. The volatile constituents of the offgas were recovered via a condenser. At the same time as the flushing with nitrogen, the nominal heating temperature was set to 160° C. Drying was complete after 50 minutes.

At the end, the bottom of the reactor was slowly opened and the aerogel granules were discharged by a pulse of nitrogen. This left behind 6.1 kg of aerogel granules of extremely homogeneous quality having a particle size between 0.5 and 6 mm. Analysis of the material revealed a bulk density of 0.112 g/cm$^3$ and a thermal conductivity of 17.8 mW/(m K) for the bulk material. The total process time was about 4 hours.

Comparative Example 2

Preparation of an Aerogel in a Honeycomb Reactor and Subsequent Drying in a Drying Cabinet A section of hexagonal polypropylene plastic honeycomb (Tubus Waben, cell size 8 mm, length 450 mm) was inserted in a vertical orientation into a stainless steel drum body having an approximate capacity of 45 L, coated on the inside with ethylene tetrafluoroethylene (ETFE), and having a hermetically closable lid, so as to fill the entire vessel volume with the honeycomb block except for an approximately 4 cm air gap at the lid. The lid and base of the drum were each equipped with a ball valve; the drum was mounted on an aluminum frame that allowed it to rotate freely over a horizontal axis. A sol concentrate prepared from Dynasylan®-40 (manufacturer: Evonik Ressource Efficiency GmbH) was then diluted to a silicate content of 6.0% by weight in analogous manner to example 2, the volume fraction of HMDSO in the sol being 29.2% by volume, activated by addition of dilute ethanolic ammonia solution, and homogenized by stirring. The drum body loaded with honeycomb was then filled with 41.1 L of this sol at room temperature. The drum was tightly sealed and transferred to a heating cabinet of sufficient capacity preheated to 65° C. Gelation commenced after approx. 10 minutes, as measured by a residual amount of the activated sol at room temperature. After an aging time of 72 hours at 65° C., the drum was removed from the heating cabinet, opened carefully, and the lid removed. 11.8 L of syneresis liquid was then carefully drained off via the bottom valve, which was closed again at the end. 14 L of a dilute nitric acid hydrophobization catalyst solution (solvent composition ethanol:HMDSO in a volume ratio of 2:1) was then poured into the honeycomb body from above, so that the liquid covered it by approx. 5 mm. The drum reactor was closed, transferred back to the heating cabinet, and the nominal temperature increased to 80° C. The gel rods were hydrophobized in this manner for 24 hours. The drum reactor was then removed from the heating cabinet and opened carefully (slight overpressure). The excess hydrophobization catalyst liquid was drained off via the bottom valve. The honeycomb block was then removed from the drum using a dedicated auxiliary structure and the hydrophobized gel rods were drained by tapping.

The gel pieces were then dried in a drying cabinet under a nitrogen atmosphere at 150° C. with circulating air (air exchange rate: approx. 10× per hour) for 3 hours. This afforded 2.3 kg of an aerogel material, which consisted largely of relatively large cylindrical rod fragments. The composition of the fragments was very similar to that from example 1. The bulk density of the material thus obtained was 0.115 g/cm³. A sample of the aerogel material was mechanically comminuted, resulting in a broad distribution of particles between 0.2 mm and 6 mm, and the thermal conductivity of the bulk material was determined as 16.7 mW/(m K) with the aid of a two-plate device.

Compared to example 4, comparative example 2 has the disadvantage of needing an additional transfer, for example via an airlock system, of hydrophobized gel to an additional drying unit that would need to be purchased, as well as associated additional investment costs.

The invention claimed is:

1. A process for producing an aerogel material based on amorphous silica, comprising the following steps:
    a) preparing a mixture comprising silica sol, alcohol, and a hydrophobizing agent activatable by acid catalysis;
    b1) adding a base to the mixture formed in step a) and mixing the resulting mixture;
    b2) gelation of the mixture comprising silica sol obtained in step (b1) b1), resulting in the formation of a silica gel, and optional aging of the gel;
    c) adding a hydrophobization catalyst to the silica gel formed in step b2) and optionally aged, in-situ formation or controlled release of a hydrophobization catalyst, and initiation of the acid-catalyzed hydrophobization of the silica gel;
    d) removing the volatile constituents of the mixture formed in step c) by subcritical drying, resulting in the formation of the aerogel material;
    wherein at least steps b2) to d) are carried out in the same reactor and wherein:
        i) during said subcritical drying in step d), the reactor comprises an axis of symmetry that forms a horizontal angle of 10 to 45 degrees; and/or
        ii) during said subcritical drying in step d), a carrier gas is passed into the reactor and then exits after mixing with the gaseous constituents in the reactor.

2. The process of claim 1, wherein step a) is carried out by hydrolysis of an alcoholic solution of an organosilicate selected from the group consisting of tetraethyl orthosilicate (TEOS), tetramethyl orthosilicate (TMOS), tetraisopropyl orthosilicate (TPOS), and mixtures thereof and subsequent dilution using an organic solvent mixture consisting of alcohol, a hydrophobizing agent activatable by acid catalysis, and water.

3. The process of claim 1, wherein the alcohol is selected from the group consisting of methanol, ethanol, n-propanol, isopropanol, butanol, and mixtures thereof.

4. The process of claim 1, wherein the hydrophobizing agent activatable by acid catalysis is selected from the group consisting of hexamethyldisiloxane, trimethylethoxysilane, trimethylmethoxysilane, and mixtures thereof.

5. The process of claim 1, wherein the base used in step b1) is selected from the group consisting of ammonia, ammonium fluoride, and aminosilanes.

6. The process of claim 1, wherein step b2) is carried out at a temperature of 80 to 120° C. within 20 to 180 minutes.

7. The process of claim 1, wherein the hydrophobization catalyst is selected from the group consisting of hydrogen chloride, nitric acid, sulfuric acid, trimethylchlorosilane, and mixtures thereof.

8. The process of claim 1, wherein hydrophobization of the silica according to step c) is carried out at a temperature of 80 to 130° C., at a pressure of 1.2 to 4 bar, within 10 to 180 minutes.

9. The process of claim 1, wherein step d) is carried out at a temperature of 100 to 200° C. and at a pressure of 0.1 to 4 bar.

10. The process of claim 1, wherein, during the performance of step d), a preheated carrier gas is passed into the reactor continuously and, after mixing with gaseous constituents in the reactor, exits the reactor.

11. The process of claim 10, wherein the carrier gas is nitrogen and is passed into the reactor at a gas hourly space velocity of 150 to 1500 $h^{-1}$.

12. The process of claim 10, wherein an axially symmetric reactor is used in step d) which comprises an axis of symmetry that forms a horizontal angle of 10 to 45 degrees during the performance of this step.

13. The process of claim 1, wherein an axially symmetric reactor is used in step d) which comprises an axis of symmetry that forms a horizontal angle of 10 to 45 degrees during the performance of this step.

* * * * *